(12) United States Patent
Udo et al.

(10) Patent No.: US 8,837,086 B2
(45) Date of Patent: Sep. 16, 2014

(54) MAGNETIC RECORDING HEAD, MANUFACTURING METHOD THEREOF, AND MAGNETIC DISK DEVICE

(75) Inventors: Yuta Udo, Odawara (JP); Katsuro Watanabe, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/402,914

(22) Filed: Feb. 23, 2012

(65) Prior Publication Data

US 2013/0063837 A1 Mar. 14, 2013

(30) Foreign Application Priority Data

Sep. 13, 2011 (JP) .................................. 2011-199211

(51) Int. Cl.
*G11B 5/127* (2006.01)
*G11B 5/31* (2006.01)
*G11B 5/187* (2006.01)
*G11B 5/00* (2006.01)

(52) U.S. Cl.
CPC ............ *G11B 5/1278* (2013.01); *G11B 5/3146* (2013.01); *G11B 2005/0024* (2013.01); *G11B 5/187* (2013.01)
USPC ........................................ 360/125.3; 360/128

(58) Field of Classification Search
CPC ..................... G11B 2005/0024; G11B 5/1278; G11B 5/3133; G11B 5/187
USPC .................................. 360/128, 125.3, 125.71
See application file for complete search history.

(56) References Cited

U.S. PATENT DOCUMENTS

| 2009/0052095 | A1* | 2/2009 | Yamada et al. | 360/324 |
| 2009/0080109 | A1* | 3/2009 | Fukuzawa et al. | 360/122 |
| 2009/0225465 | A1* | 9/2009 | Iwasaki et al. | 360/75 |
| 2009/0310244 | A1* | 12/2009 | Shimazawa et al. | 360/75 |
| 2010/0007996 | A1* | 1/2010 | Iwasaki et al. | 360/324 |
| 2010/0220415 | A1* | 9/2010 | Yamada et al. | 360/319 |
| 2011/0216435 | A1* | 9/2011 | Shiimoto et al. | 360/59 |

FOREIGN PATENT DOCUMENTS

| JP | 6-243527 | 9/1994 |
| JP | 2009-70541 | 4/2009 |
| JP | 2010257539 A | * 11/2010 |

OTHER PUBLICATIONS

Jian-Gang Zhu et al., Microwave Assisted Magnetic Recording, IEEE Transactions on Magnetics, Jan. 2008, pp. 125-131, vol. 44, No. 1.

(Continued)

*Primary Examiner* — Will J Klimowicz
(74) *Attorney, Agent, or Firm* — Antonelli, Terry, Stout & Kraus, LLP.

(57) ABSTRACT

A magnetic recording head used for microwave-assisted magnetic recording includes: a main pole; a spin torque oscillator provided on the main pole, including a high-speed rotating magnetization layer in which the magnetization is rapidly rotated by a spin torque; a trailing shield provided on the spin torque oscillator; and a sub pole magnetically coupled to the trailing shield provided in a medium-facing surface, extending in a vertical direction to the medium-facing surface. Then, a non-magnetic electrode is provided on the outside of a trailing gap in which the spin torque oscillator is provided with respect to a magnetic material of the main pole, the trailing shield, or the sub pole, to prevent the line resistance variation due to the AMR effect or the eddy current. Thus, the variation of the current flowing to the spin torque oscillator can be controlled to achieve stable oscillation.

12 Claims, 21 Drawing Sheets

(56) References Cited

OTHER PUBLICATIONS

Yiming Wang et al., Media damping constant and performance characteristics in microwave assisted magnetic recording with circular ac field, Journal of Applied Physics, 105, 07B902,2009; doi: 10.1063/1.3067839, view online: http://dx.doi.org/10.1063/1.3067839, Jan. 24, 2012.

* cited by examiner

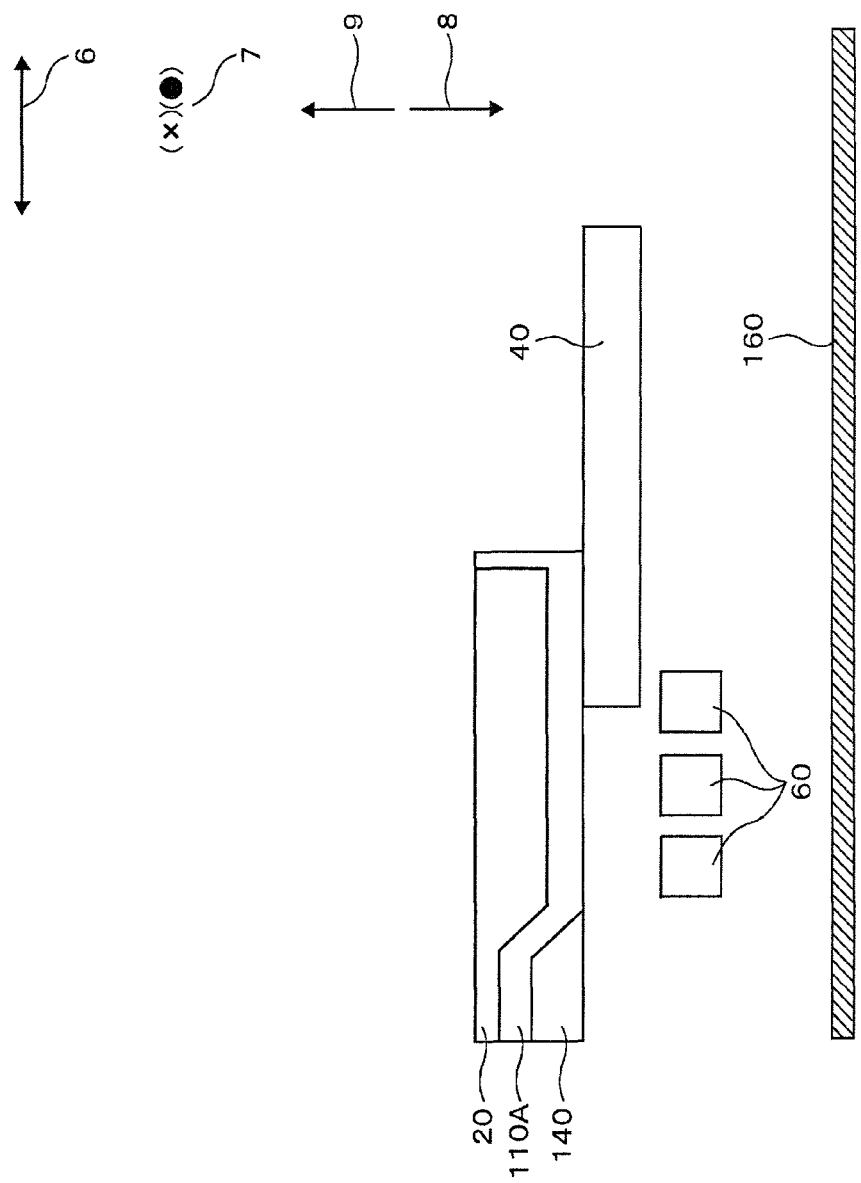

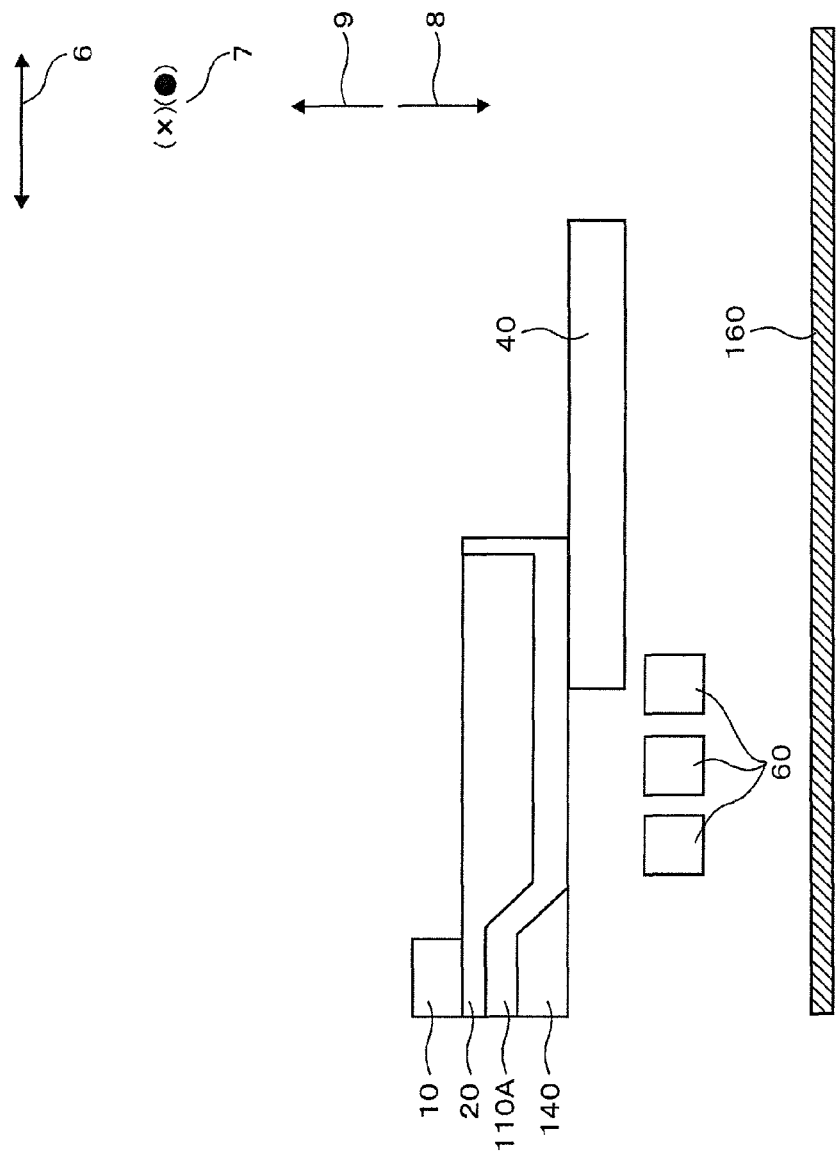

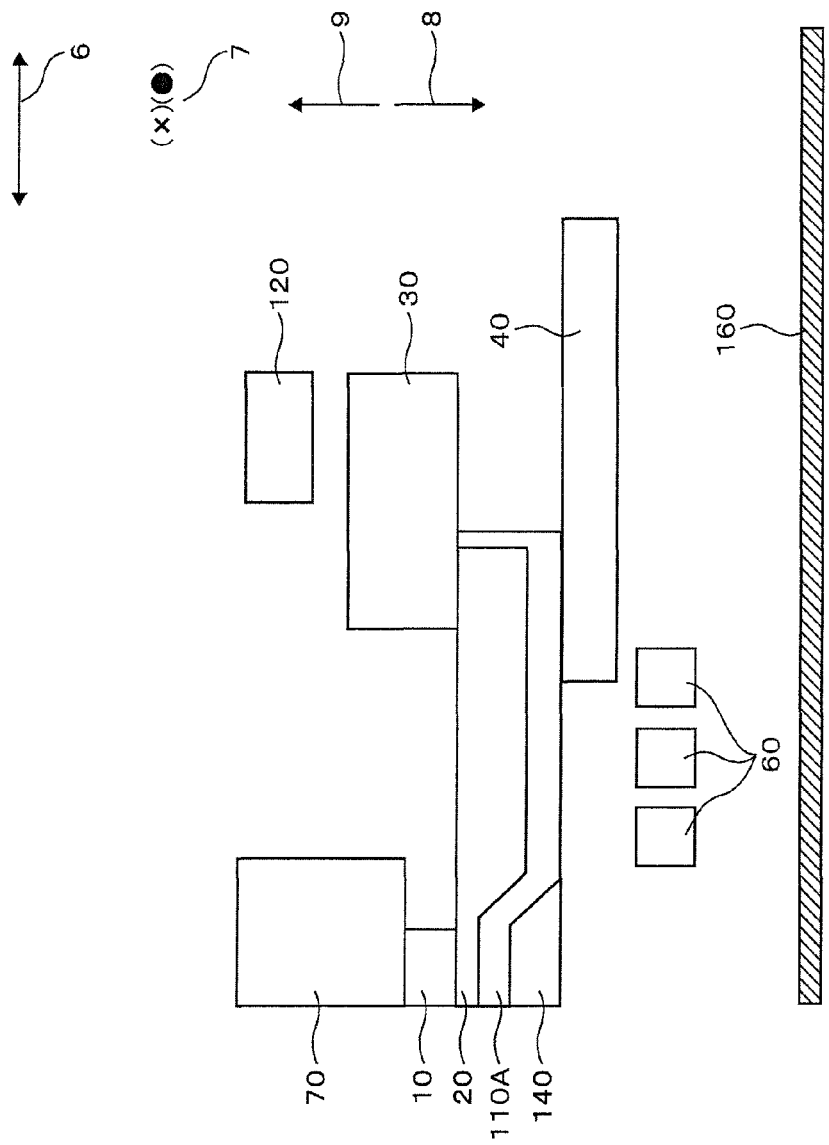

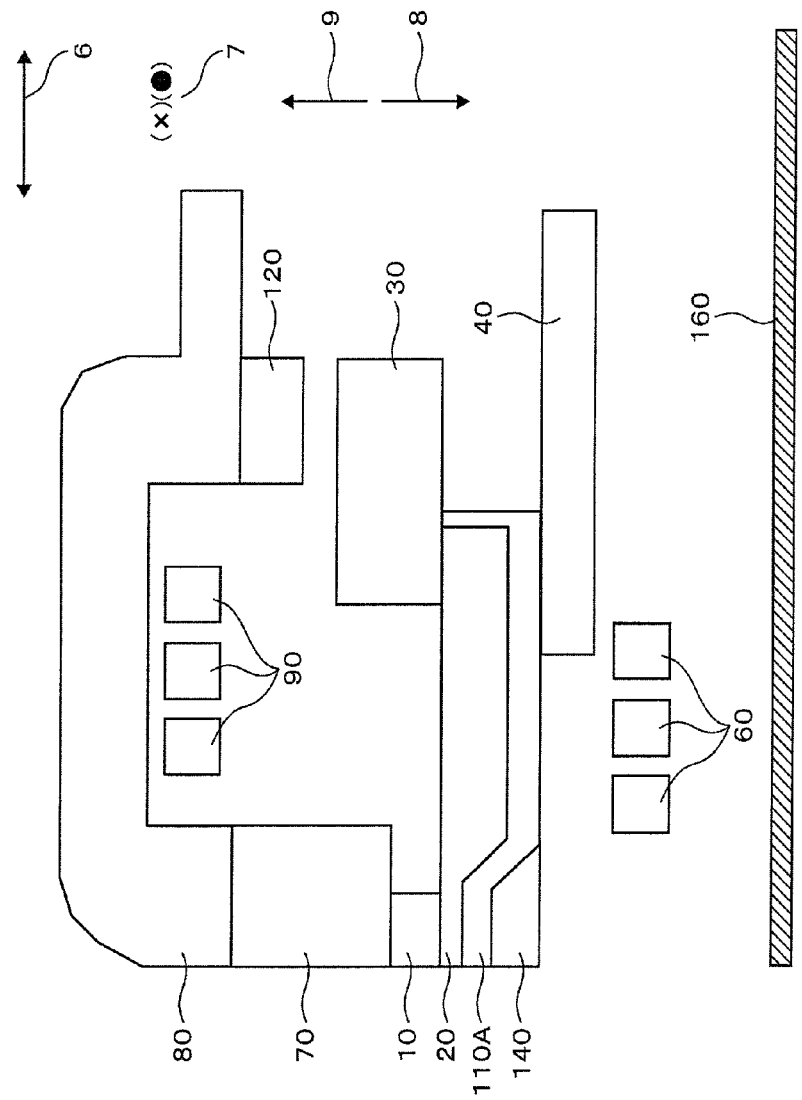

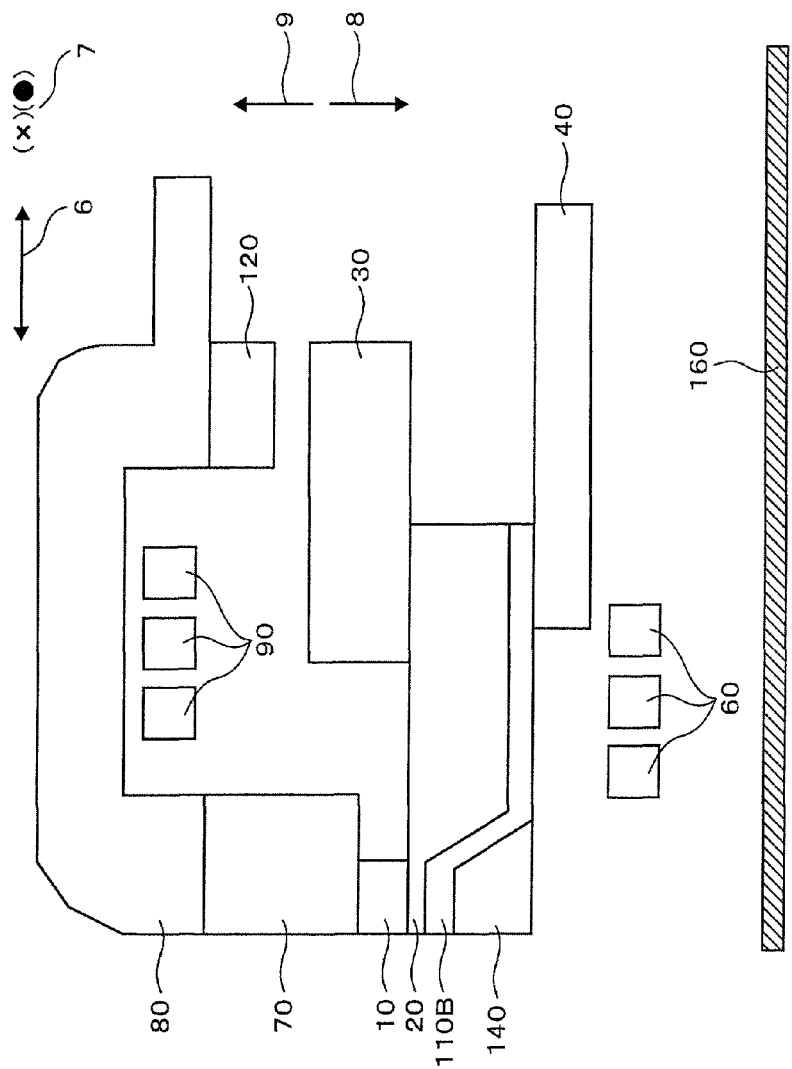

MAGNETIC RECORDING HEAD, MANUFACTURING METHOD THEREOF, AND MAGNETIC DISK DEVICE

INCORPORATION BY REFERENCE

The present application claims priority from Japanese application serial No. 2011-199211, filed on Sep. 13, 2011, the entire contents of which are hereby incorporated by reference into this application.

FIELD OF THE INVENTION

The present invention relates to a magnetic recording head, a manufacturing method thereof, and a magnetic disk device. More particularly, the present invention relates to a magnetic recording head including a spin torque oscillator in a microwave-assisted magnetic recording head system, a manufacturing method of the magnetic recording head, and a magnetic disk device including the magnetic recording head.

BACKGROUND OF THE INVENTION

In recent years, there is a demand for high recording density in hard disk drives (HDD) with a rapid growth of about 40% per year. In order to achieve such a high growth rate, it is necessary to write data to a magnetic recording medium with smaller track width and bit length. This leads to the requirement of further micro fabrication of the magnetic recording head. However, when the magnetic recording head is micro fabricated, the recording magnetic field generated from the magnetic recording head is also reduced. As a result, sufficient magnetic field may not be obtained to record data to the magnetic recording medium. Thus, attention is drawn to a technology that facilitate writing to the magnetic recording medium, by supplying an additional energy to the magnetic field generated by the magnetic recording head alone to achieve a desired level. The technology, called energy assisted recording, reduces the magnetic field necessary for the magnetization reversal by adding some energy to the medium, in order to write magnetic signals to the recording medium in which recording may not be possible in general. Thus, the technology makes it possible to increase the recording capability and reduce the recording area. There are two methods known as energy that is used for assisting such recording. One is a recording method using the heat generated by a laser beam (heat-assisted magnetic recording). The other is a recording method using the microwave generated by a high frequency oscillator (microwave-assisted magnetic recording).

In particular, the recording technology using microwave has just recently emerged and is expected to be one of the energy assisted recording. JP-A No. 243527/1994 discloses a technology for easy writing with a small recording magnetic field by irradiating a recording element of a magnetic head, or a magnetic recording medium, with a high frequency field, to locally reduce the coercive field strength of the medium by the Joule heating or eddy current heating.

J. G. Zhu and X. Zhu, 'Microwave-assisted Magnetic Recording,' The Magnetic Recording Conference (TMRC) 2007 Paper B6 (2007) discloses a technology (microwave-assisted magnetic recording technology) using a high frequency magnetic field. The technology is designed to generate microwaves by providing a field generation layer (FGL) in which the magnetization is rapidly rotated by a spin torque located adjacent to a main pole of a perpendicular magnetic head, in order to record information to a magnetic recording medium with a large magnetic anisotropy. Further, Y. Wang, et. al, "Media damping constant and performance characteristics in microwave-assisted magnetic recording with circular as field", Journal of Applied Physics, vol. 105, pp 07B902-07B902-3 (2009) discloses a technology that is designed to provide a spin torque oscillator between the main pole of the magnetic recording head and a trailing shield, in order to effectively assist the magnetization reversal of the magnetic recording medium by changing the rotation direction of the high frequency magnetic field according to the recording magnetic field polar character.

According to the reports in these documents, it is found that the microwave-assisted magnetic recording can be combined with the existing perpendicular magnetic recording head, so that research and development of microwave-assisted magnetic recording has been accelerated due to its high feasibility.

The existing write head has a magnetic gap (hereinafter referred to as TS gap) between a main pole and a trailing shield. Normally, a current is not supplied to the main pole and the trailing shield, so that in general the material constituting the TS gap is an insulating material.

However, in the case of microwave-assisted magnetic recording, in general, a spin torque oscillator is provided between the main pole and the trailing shield. It is necessary to supply current to the spin torque oscillator to generate a high frequency magnetic field. In other words, it is necessary to supply current to the main pole and the trailing shield.

However, the configuration of the existing write head is different from the configuration of the microwave-assisted magnetic recording. For this reason, there are three important problems in the supply of the current.

The first problem is the variation of the resistance due to the anisotropic magneto-resistance (AMR) effect (hereinafter referred to as the AMR effect) or the eddy current. In the existing write head, writing is performed by supplying current (called recording current) to a coil located in the vicinity of the main pole, to excite magnetic film such as the main pole and the trailing shield. When the current is supplied to the spin torque oscillator to obtain assist by microwave irradiation, the direction of the magnetization in the magnetic film varies according to the increase and decrease of the recording current. At this time, when the main pole and the trailing shield are used as a line to supply the current to the spin torque oscillator, the relative angle between the direction of the magnetization in the magnetic film and the direction of the oscillator current is changed. As a result, the AMR effect occurs.

There is a risk that the resistance of the magnetic film material may vary due to the AMR effect. When the current is supplied with a fixed voltage to the spin torque oscillator in which the resistance varies due to the AMR, the current value flowing through the spin torque oscillator also varies, thus preventing stable oscillation of the spin torque oscillator. Further, when the direction of the magnetization in the magnetic film varies according to the increase and decrease of the recording current, the eddy current flows through the magnetic film so as to prevent the variation. This is particularly significant when the recording current is reversed. Because of this phenomenon, the oscillator current varies, thus preventing stable oscillation of the spin torque oscillator. The influence of the two phenomena is significant when the pattern of the main pole and the trailing shield is reduced to meet the demand for higher recording density. Thus, this is one of the considerable problems.

In order to solve the first problem, as described in JP-A No. 070541/2009, there is a method for providing a non-magnetic line between the spin torque oscillator and the main pole, and between the spin torque oscillator and the trailing shield, respectively, instead of using the main pole and the trailing shield as the line.

However, when the electrode layer is inserted in the TS gap as described above, the magnetic gap between the main pole and the trailing shield is increased. The magnetic field to be vertically applied to the lamination direction of the spin torque oscillator is reduced. As a result, it is difficult to increase the frequency of the generated high frequency magnetic field, and there is a risk that sufficient assist effect may not be obtained. Thus, the second problem is not to increase the TS gap, and preferably, to reduce the TS gap.

The third problem is to reduce the element resistance including the line of the spin torque oscillator. The main pole and the trailing shield, which sandwich the spin torque oscillator therebetween, are designed to be able to produce a strong magnetic field to record information to a recording medium. For this reason, it is difficult to reduce the resistance of the spin torque oscillator as the line by freely forming the shape and film thickness thereof. Further, when a magnetic material is used as a line, there is a risk that the line resistance is increased. This is because the resistance ratio of magnetic metals generally used as lines is higher than the resistance ratio of non-magnetic metals.

On the other hand, it is necessary to increase the spin torque effect in order to oscillate the spin torque oscillator. One method for obtaining a large spin torque effect is to supply current with a high current density. In this case, it is desirable that the line resistance is low, taking into account the long-term reliability and the influence of the resistance increase due to the heat generation.

SUMMARY OF THE INVENTION

The present invention is made to solve at least one of the three problems. In other words, an object of the present invention is to stabilize the operation of the spin torque oscillator in microwave-assisted magnetic recording, and to provide a current supply configuration to achieve sufficient assist effect.

According to an aspect of the present invention, there is provided a magnetic recording head, preferably, a magnetic recording head used for microwave-assisted magnetic recording. The magnetic recording head includes a main pole. Further, a spin torque oscillator is provided on the main pole, including a Field Generation Layer in which the magnetization is rapidly rotated by a spin torque. Further, a shield magnetic film is provided on the spin torque oscillator. Further, an upper pole is provided on the shield magnetic film. Then, a non-magnetic electrode is disposed adjacent to at least one of magnetic bodies constituting poles, namely, adjacent to the main pole, or the trailing shield or the sub pole. That is, the present invention is configured such that the non-magnetic electric line is provided in the vicinity of the main pole or the sub pole to serve as a current supply path to the spin torque oscillator. In this way, it is possible to prevent the TS gap from increasing due to the insertion of a new electrode as in the existing case, and to allow current with a high current density to be supplied to the spin torque oscillator. In particular, a non-magnetic electric line is provided on the outside of the TS gap.

In a preferred example, in the magnetic recording head, the non-magnetic electrode is formed adjacent to the outside of the TS gap with respect to the main pole. Further, preferably in the magnetic recording head, the non-magnetic electrode is formed adjacent to the shield film. Still further, preferably in the magnetic recording head, the non-magnetic electrode is formed adjacent to the upper pole.

Further, preferably in the magnetic recording head, a side shield gap film is formed between the main pole and a side shield film that is provided in the vicinity of the main pole. The side shield gap film is formed from a non-magnetic material. Then, the non-magnetic electrode is formed adjacent to the side shield gap film.

Further, preferably in the magnetic recording head, the line of the non-magnetic material is drawn to the end of the main pole by means of the side shield gap film formed from the non-magnetic material. Still further, preferably in the magnetic recording head, the non-magnetic electrode is formed adjacent to the side shield and is electrically coupled thereto.

Further, preferably in the magnetic recording head, a yoke magnetic film is formed on the main pole, and the non-magnetic electrode is formed adjacent to the main pole. The yoke magnetic film and the non-magnetic electrode are electrically coupled to form a parallel electrical circuit.

Further, preferably, the material used for the non-magnetic electrode is a single layer film of Al, Ti, V, Cr, Cu, Ru, Rh, Pd, Ag, Ta, W, Ir, Pt, and Au, or a laminated film including these materials.

Further, preferably, the material used for the shield gap film is a single layer film of Al, Ti, V, Cr, Cu, Ru, Rh, Pd, Ag, Ta, W, Ir, Pt, and Au, or a laminated film including these materials.

According to the present invention, a method of manufacturing a magnetic recording head preferably includes the steps of: forming a non-magnetic electrode; forming a main pole on the non-magnetic electrode; forming a side shield film on the outside of the main pole; forming a shield gap film between the main pole and the side shield film; forming a yoke magnetic film on the main pole; forming a spin torque oscillator on the main pole; etching the spin torque oscillator to a desired track width and stripe height; burying the etched portion by an insulating film; removing the mask used for the etching; and forming a magnetic film by a sputtering method or a plating method on the spin torque oscillator in which the track and the stripe height are formed respectively.

Further, according to the present invention, a magnetic disk device is preferably designed to write information to a rotating magnetic disk by moving a magnetic head in a predetermined direction. The magnetic head is the magnetic head used for microwave-assisted magnetic recording. The magnetic head includes a main pole. Further, a spin torque oscillator is provided on the main pole, including a Field Generation Layer in which the magnetization is rapidly rotated by a spin torque. Further, a magnetic film is provided on the spin torque oscillator. Then, a non-magnetic electrode is outside the TS gap of at least one of magnetic bodies constituting magnetic poles. In other words, the non-magnetic pole is provided adjacent to the main pole, or the trailing shield or the sub pole.

According to the present invention, the electrode of the non-magnetic material is extended to the end of the magnetic pole. This makes it possible to prevent the resistance variation due to the AMR effect or the eddy current, and to stabilize the oscillation of the spin torque oscillator. Further, the electrode of the non-magnetic material is provided on the outside of the TS gap of the magnetic pole, so that the TS gap can be physically reduced and higher assist effect can be expected.

BRIEF DESCRIPTION OF THE DRAWINGS

FIG. 6B is a cross-sectional view showing the manufacturing process of the magnetic recording head in the first embodiment;

FIG. 6C is a cross-sectional view showing the manufacturing process of the magnetic recording head in the first embodiment;

FIG. 6D is a cross-sectional view showing the manufacturing process of the magnetic recording head in the first embodiment;

FIG. 6E is a cross-sectional view showing the manufacturing process of the magnetic recording head in the first embodiment;

FIG. 13A is a cross-sectional view of the recording head including the spin torque oscillator in the seventh embodiment;

DETAILED DESCRIPTION OF THE PREFERRED EMBODIMENTS

The present invention is designed to reduce the electrical resistance of a line and to prevent the variation in the electrical resistance of the line, by providing a non-magnetic electrode on the outside of a magnetic pole in microwave-assisted magnetic recording. Hereinafter, some embodiments will be described with reference to the accompanying drawings.

First Embodiment

Figure 1:
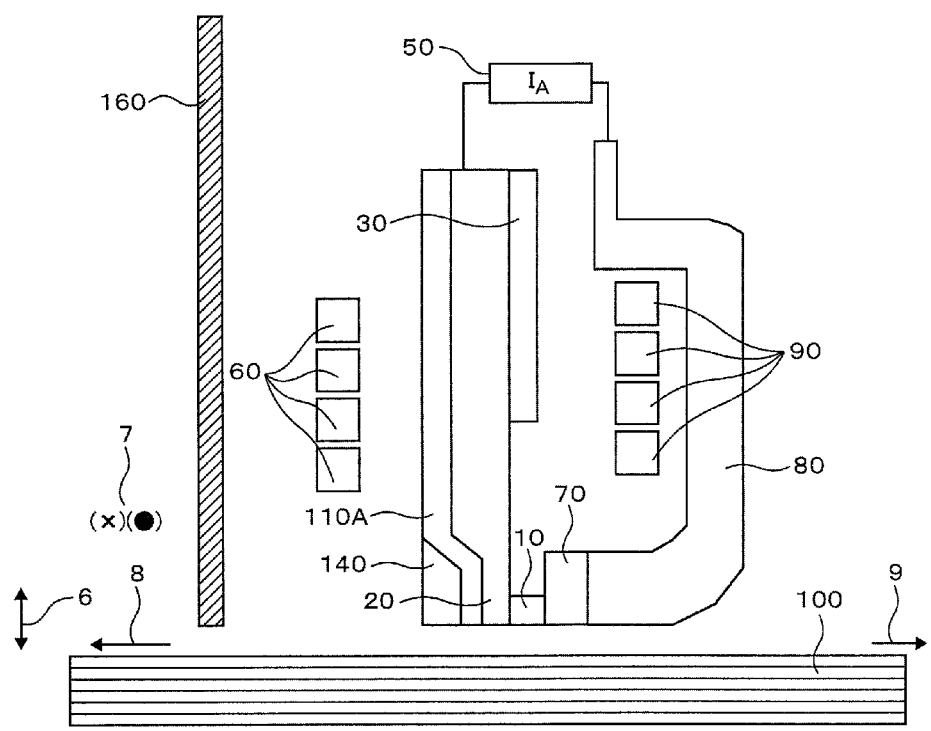
FIG. 1 is a cross-sectional view of a recording head including a spin torque oscillator in an embodiment.

FIG. 1 shows the configuration of a magnetic recording head including a spin torque oscillator.

In FIG. 1, reference numeral 10 denotes a spin torque oscillator, 20 denotes a main pole, 30 denotes a yoke magnetic film, 50 denotes a current source, 60 denotes a lower coil, 70 denotes a trailing shield, 80 denotes a sub pole, 90 denotes an upper coil, 100 denotes a magnetic recording medium, 110A denotes a shield gap film, 140 denotes a leading edge shield, and 160 denotes a base for supporting the magnetic recording head.

In FIG. 1, an arrow 8 indicates the moving direction of the head with respect to the medium 100, while an arrow 9 indicates the moving direction of the medium 100 with respect to the head. For the simplification of the expression in the following description, the direction of the arrow 8 is expressed as "lower part", or "lower side" or "bottom side", while the direction of the arrow 9 is expressed as "upper part", or "upper side" or "top side". Thus, the "upper magnetic pole" represents the "sub pole 80", and the "lower magnetic pole" represents the "main pole 20". A height direction 6 shown in FIG. 1 indicates the vertical direction on the surface of the magnetic recording medium 100. Further, a symbol 7 indicating the vertical direction to the paper represents the track direction that specifies the track width when a magnetic signal is written to the medium 100.

Further, in general, the magnetic head also includes a reproducing head. Although not shown in this specification, the reproducing head may be provided in either of the upper and lower parts of the magnetic recording head.

Figure 3A:
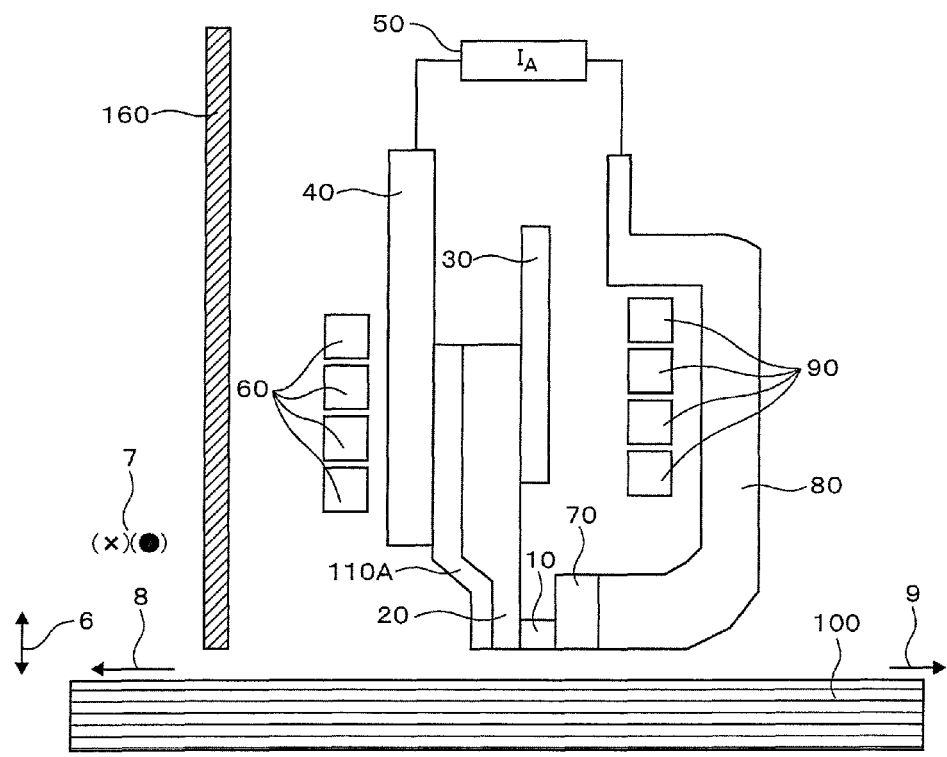
FIG. 3A is a cross-sectional view of a recording head including a spin torque oscillator according to an embodiment of the present invention.

FIG. 3A is a schematic cross-sectional view of the surface including the spin torque oscillator 10 in the head moving direction 8 in the magnetic recording head according to the first embodiment of the present invention. The feature of this configuration is that the shield gap film 110A is preferably formed from a metal material with a low resistivity, such as a single layer film of Al, Ti, V, Cr, Cu, Ru, Rh, Pd, Ag, Ta, W, Ir, Pt, and Au, or a laminated film including these materials. A non-magnetic electrode 40 is provided on the lower side of the shield gap film 110A. In this way, the current supplied to the spin torque oscillator 10 does not flow to the yoke magnetic film 30, and the current flowing through the main pole 20 can be reduced. Thus, it is possible to reduce the variation in the electrical resistance due to the AMR effect or the eddy current as compared to the case of using only the yoke magnetic film 30 and the main pole 20 as an electrode. As a result, a stable oscillation of the spin torque oscillator 10 can be maintained. At this time, the effect becomes larger as the electrical resistance of the shield gap film 110 of a conductive material and the non-magnetic electrode 40 becomes lower than the electrical resistance of the main pole 20 in the current path.

At this time, the position in the stripe height direction of the non-magnetic electrode 40 can be arbitrary set, unless it does not function as the line. However, from the point of view of reducing the electrical resistance, it is desirable that the non-magnetic electrode 40 is disposed closer to the magnetic recording medium than the yoke magnetic film 30 is disposed. In other words, the non-magnetic electrode 40 is extended close to the end of the main pole 20.

Figure 2:
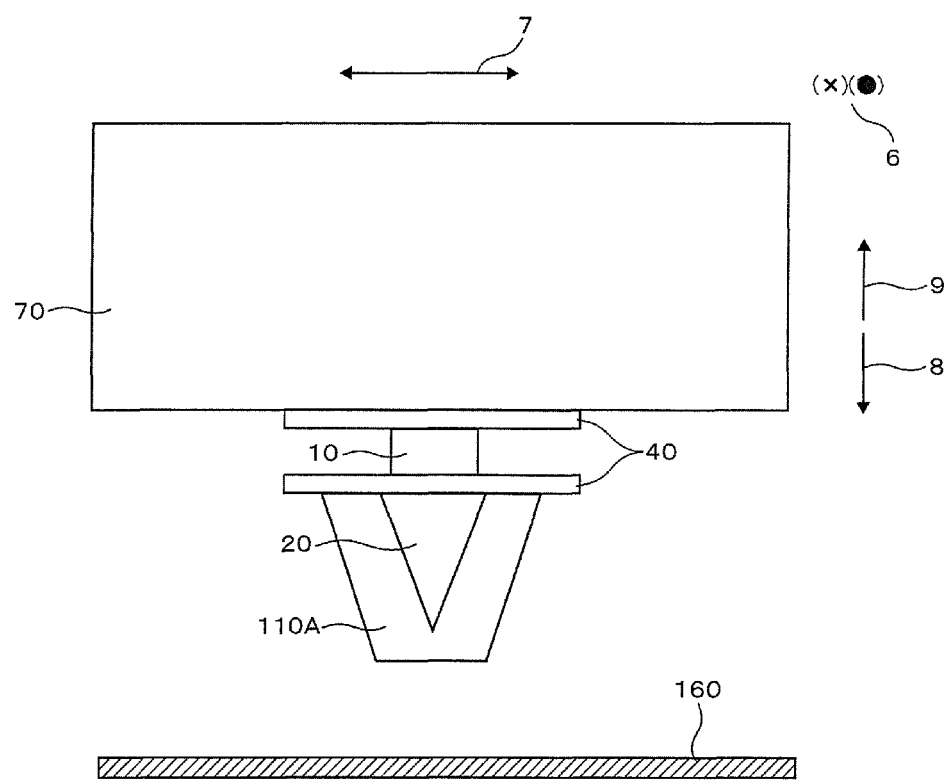
FIG. 2 is a schematic diagram of the medium-facing surface of the recording head including the spin torque oscillator in a comparative example.

FIG. 2 shows a configuration in the medium-facing surface (Air Bearing Surface), which is a comparative example. The configuration is such that the non-magnetic electrode 40 is provided on the top and bottom of the spin torque oscillator 10. In such a configuration, the magnetic distance between the main pole 20 and the trailing shield 70, namely, the TS gap increases, so that the magnetic field to be applied to the spin torque oscillator is reduced. As a result, it is difficult to increase the frequency of the generated AC magnetic field. Thus, sufficient assist effect may not be obtained. Further, in particular, when a metal material with a low resistivity is used for the non-magnetic electrode 40, there is a possibility that corrosion and smear may occur in a lapping process in which the element of the magnetic head is ground to a desired stripe height after the wafer process. In order to prevent this, it is necessary to reduce the cross-sectional area of the non-magnetic electrode 40 that is exposed to the medium-facing surface. This can be achieved by reducing the film thickness of the electrode and by reducing the width thereof. This requires accurate alignment of the formation of the non-magnetic electrode 40 and the formation of the main pole 20, thus requiring particular attention in terms of the process involved.

Figure 3B:
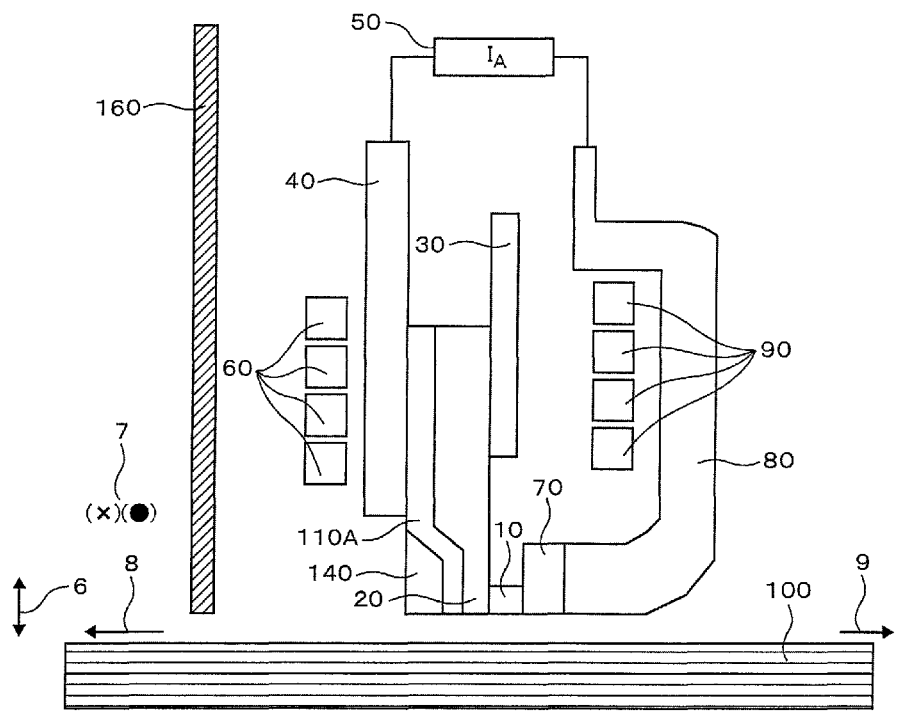
FIG. 3B is a cross-sectional view of the recording head including the spin torque oscillator according to an embodiment of the present invention.

Note that as the configuration similar to that shown in FIG. 3A, a reading shield 140 may be provided on the lower side of the main pole 20 as shown in FIG. 3B.

Figure 4:
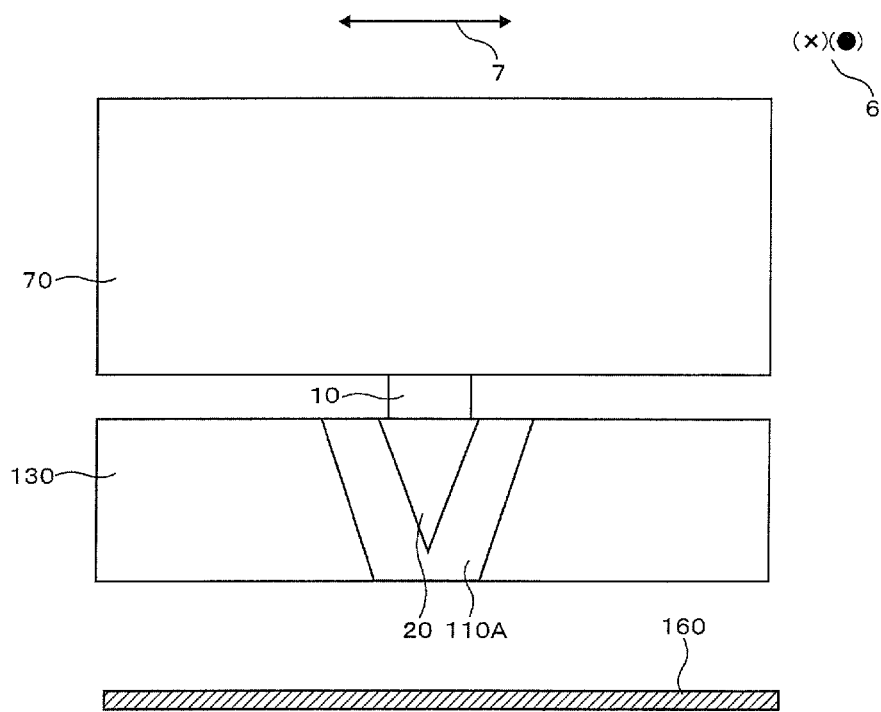
FIG. 4 is a schematic diagram of the medium-facing surface of the recording head including the spin torque oscillator according to an embodiment of the present invention.

Further, FIG. 4 shows the configuration in the medium-facing surface. A side shield film 130 is provided on both sides of the shield gap film 110A in order to further reduce the line resistance.

Figure 5:
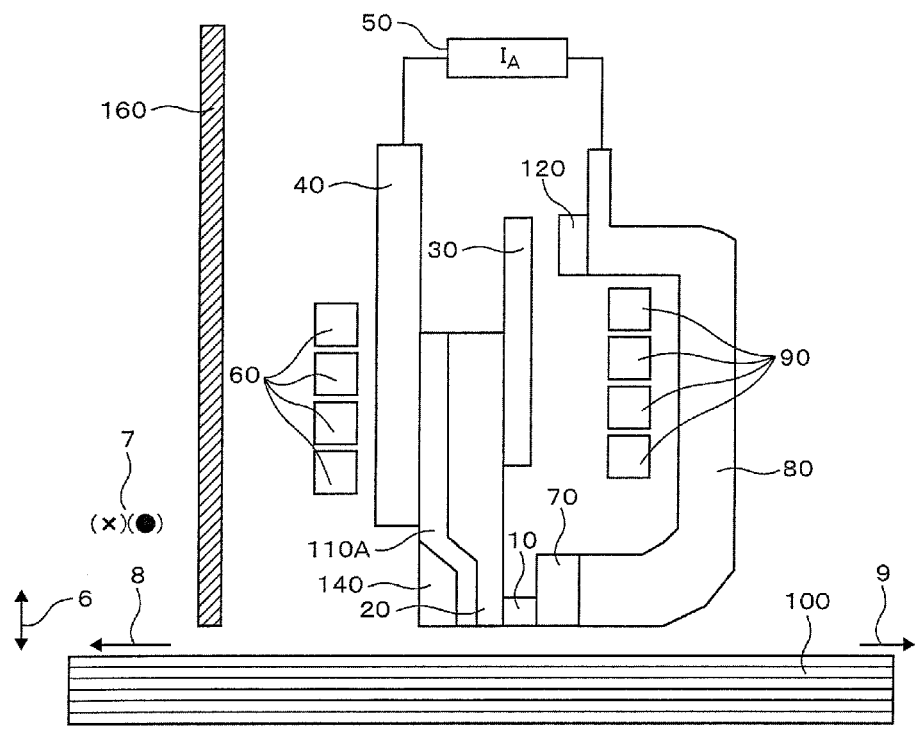
FIG. 5 is a cross-sectional view of the recording head including the spin torque oscillator according to an embodiment of the present invention.

Further, in FIG. 5, the yoke magnetic film 30 is provided in the upper part of the main pole 20. The yoke magnetic film 30 is the magnetic film for forming a back gap between the sub pole 80 and the magnetic film, and for generating a strong magnetic field. Further, the non-magnetic electrode 40 is provided on the outside of the TS gap with respect to the main pole 20. Then, a back gap distance adjustment magnetic film 120 is provided on the side of the sub pole 80. This configuration can reduce the effective magnetic path length of the recording head, and has a good high frequency response. At this time, the yoke magnetic film 30 is isolated from the back gap distance adjustment magnetic film 120 to the extent that the current does not flow.

An example of the method of manufacturing the magnetic recording head used for microwave-assisted magnetic recording having the configuration described above will be described in detail with reference to FIGS. 6A to 6E.

First, the coil 60 is formed on the substrate 160. Then, the non-magnetic electrode 40 is formed by a sputtering method or a plating method from a non-magnetic material, such as a single layer film of Al, Ti, V, Cr, Cu, Ru, Rh, Pd, Ag, Ta, W, Ir, Pt, and Au, or a laminated film including these materials (see FIG. 6A).

Next, the main pole 20 is formed on the non-magnetic electrode 40. When, the main pole 20 is formed by a damascene process that buries the main pole 20 into a trench, the shield gap film 110 provided between the side shield (130 in FIG. 4B) and the main pole 20 is replaced with a metal of a non-magnetic material, such as a single layer film of Al, Ti, V, Cr, Cu, Ru, Rh, Pd, Ag, Ta, W, Ir, Pt, and Au, or a laminated film including these materials. In this case, the shield gap film 110A can be used as an electrode line, and thus the line of the non-magnetic material can be extended to the end of the main pole 20. This shield gap film 110A is formed around the main pole 20 and disposed between the non-magnetic electrode 40 and the main pole 20 (see FIG. 6B).

Next, a magnetic layer is formed as the spin torque oscillator 10 on the main pole 20 with dimensions in the track direction 7 and in the height direction 6, respectively (see FIG. 6C).

Next, the yoke magnetic film 30 is formed on the main pole 20 by a sputtering method or a plating method. Similarly, the trailing shield 70 is formed on the spin torque oscillator 10. At this time, the back gap distance adjustment magnetic film 120 constituting the back gap is formed at the same time as the formation of the trailing shield 70, in such a way that the upper part of the yoke magnetic film 30 is isolated from the back gap distance adjustment magnetic film 120. In this way, the configuration with a good high frequency response can be obtained (see FIG. 6D).

Next, the upper coil 90 and the sub pole 80 are formed by a sputtering method or a plating method (see FIG. 6E).

Note that the coil can be either of the following: the so-called helical coil in which the lower coil 60 and the upper coil 90 are connected in the top and bottom of the main pole 20; the so-called dual pancake coil in which the lower coil 60 and the upper coil 90 are formed by individual layers respectively.

With the process steps described above, the non-magnetic electrode 40 is formed adjacent to the main pole 20 in such a way that the non-magnetic electrode 40 is electrically coupled to the lower part of the main pole 20. In this way, it is possible to manufacture the magnetic recording head that can prevent the resistance variation due to the AMR effect.

Second Embodiment

Figure 7:
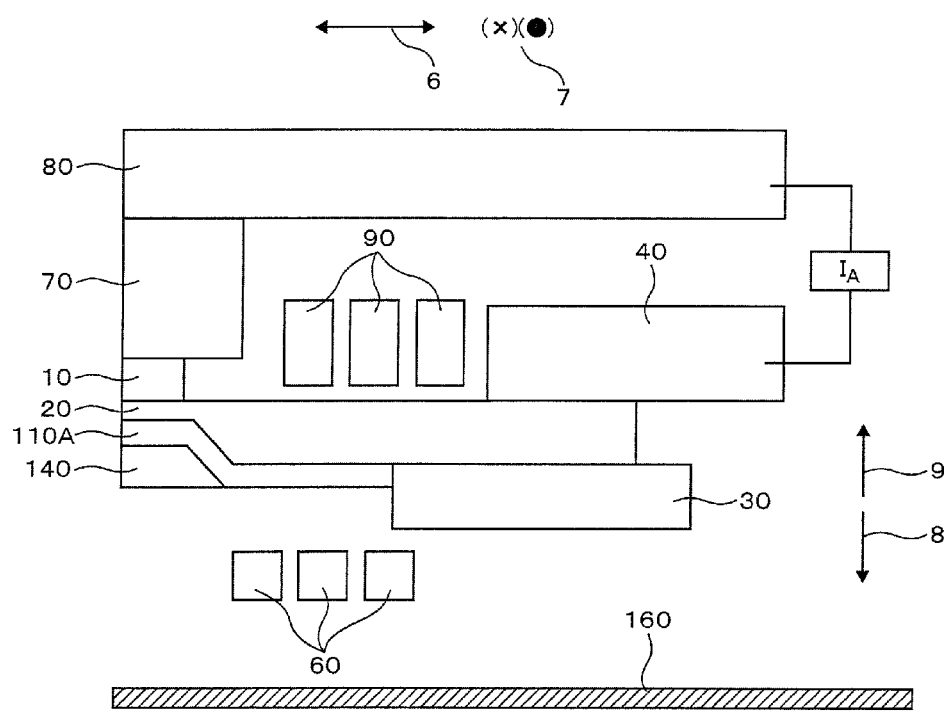
FIG. 7 is a cross-sectional view of a recording head including a spin torque oscillator according to a second embodiment of the present invention.

FIG. 7 is a schematic cross-sectional view of the surface including the spin torque oscillator 10 in the head moving direction 8 of a magnetic recording head according to a second embodiment of the present invention. The configuration is such that the yoke magnetic film 30 is provided in the lower part of the main pole 20, and that the non-magnetic electrode 40 is provided in the upper part of the main pole 20. In this way, it is possible to form the non-magnetic electrode 40 and the upper coil 90 at the same time. Thus, the number of steps is expected to be reduced from the point of view of the process.

Third Embodiment

Figure 8A:
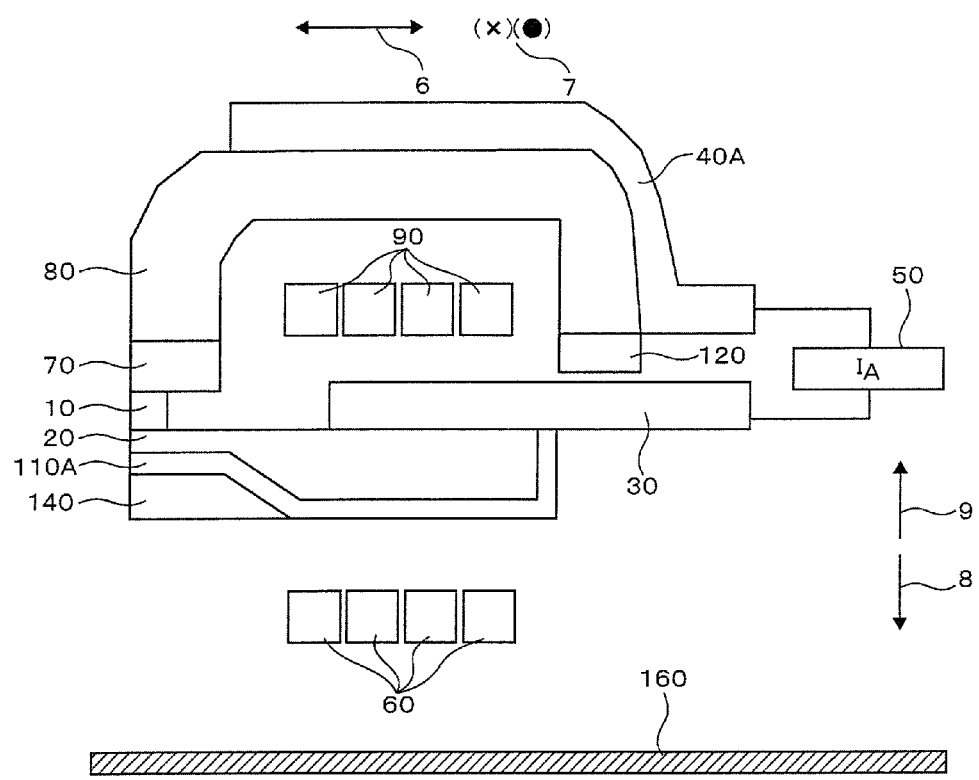
FIG. 8A is a cross-sectional view of a recording head including a spin torque oscillator in a third embodiment of the present invention.

FIG. 8A is a schematic cross-sectional view of the surface including the spin torque oscillator 10 in the head moving direction 8 of a magnetic recording head according to a third embodiment of the present invention. The configuration is such that the non-magnetic electrode 40 is provided in the upper part of the recording head, but not in the lower part thereof.

In the first and second embodiments, the non-magnetic electrode 40 is provided on the outside of the main pole 20 or the shield gap film 110A. However, in the first and second embodiments, the magnetic material (the sub pole 80) is used as the line on the upper side of the recording head, leading to the variation of the line resistance due to the AMR effect or the eddy current. Thus, in this embodiment, the configuration is such that the non-magnetic line 40 is provided on the upper side of the recording head.

Figure 6A:
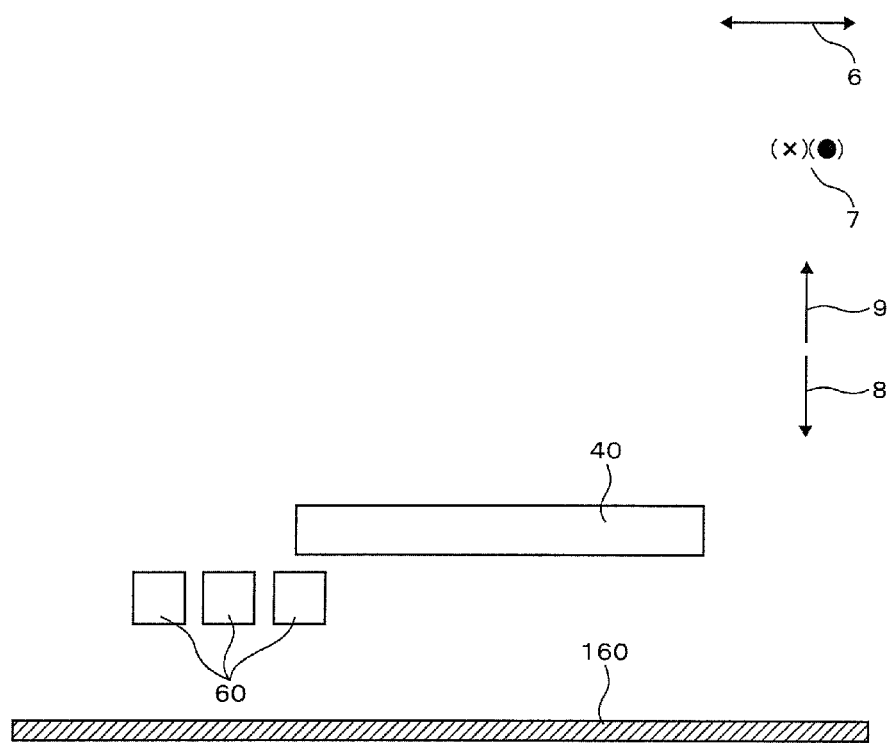
FIG. 6A is a cross-sectional view showing a manufacturing process of a magnetic recording head according to a first embodiment of the present invention.
Figure 8B:
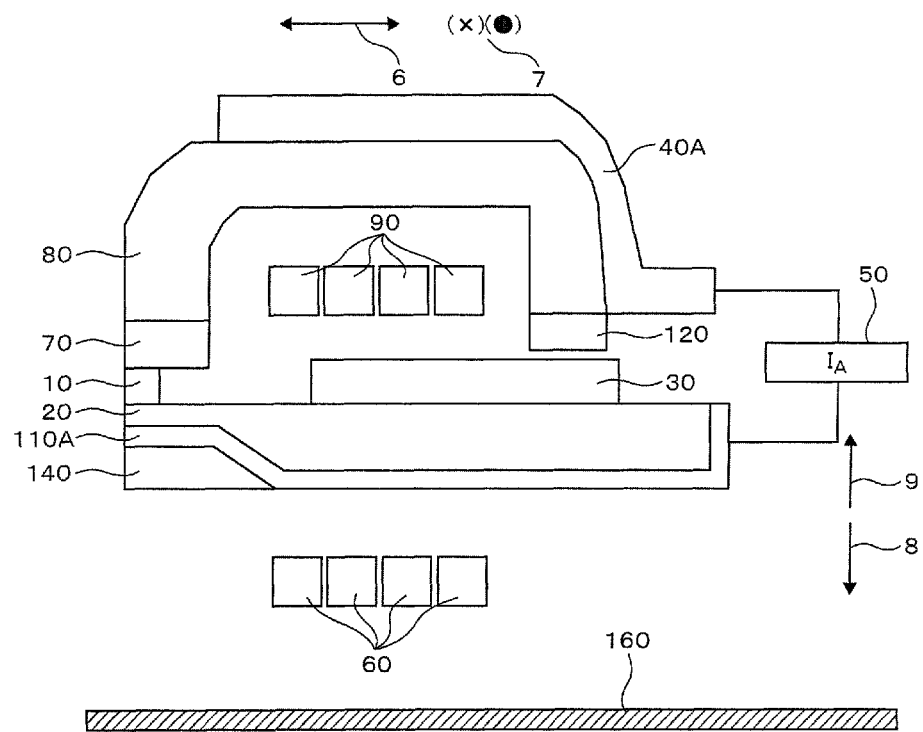
FIG. 8B is a cross-sectional view of the recording head including the spin torque oscillator in the third embodiment.

In FIGS. 6A to 6E of the first embodiment, the non-magnetic electrode 40 of the third embodiment is not formed in FIG. 6A, but is extended to the upper magnetic pole 80 (the upper core magnetic film (the sub pole)) as shown in FIG. 6E. Then, a non-magnetic electrode 40A is formed by a sputtering method or a plating method (see FIG. 8A). Although the yoke magnetic film 30 is used for the lower electrode in FIG. 8A, the shield gap film 110A of a non-magnetic conductive material can also be used for the lower electrode as shown in FIG. 8B.

Fourth Embodiment

Figure 9:
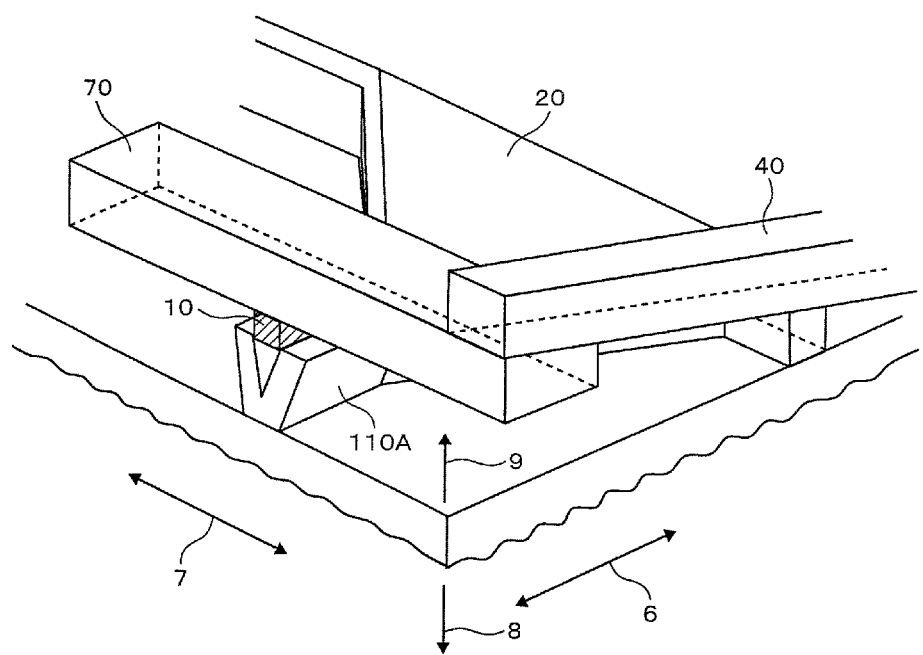
FIG. 9 is a perspective view of a recording head including a spin torque oscillator according to a fourth embodiment of the present invention.

FIG. 9 is a bird's eye view of a magnetic recording head according to a fourth embodiment of the present invention. The configuration is such that the non-magnetic electrode 40 is drawn from the trailing shield 70 in the height direction 6, which is the depth direction.

In FIG. 8 of the third embodiment, the sub pole 80 is connected to the non-magnetic electrode 40. However, in FIG. 9, the trailing shield 70 is connected to the non-magnetic electrode 40. In this case, the non-magnetic electrode 40 is drawn from the trailing shield 70, so that the sub pole 80 does not constitute a current path. Thus, it is possible to further reduce the area of the magnetic material through which the current flows. At this time, the non-magnetic electrode 40 may be drawn from any part of the trailing shield 70, but preferably is positioned so as not to interfere with the sub pole 80. Note that the trailing shield 70 and the non-magnetic electrode 40 can have any shape as long as they do not interfere with the other pattern.

Fifth Embodiment

Figure 10:
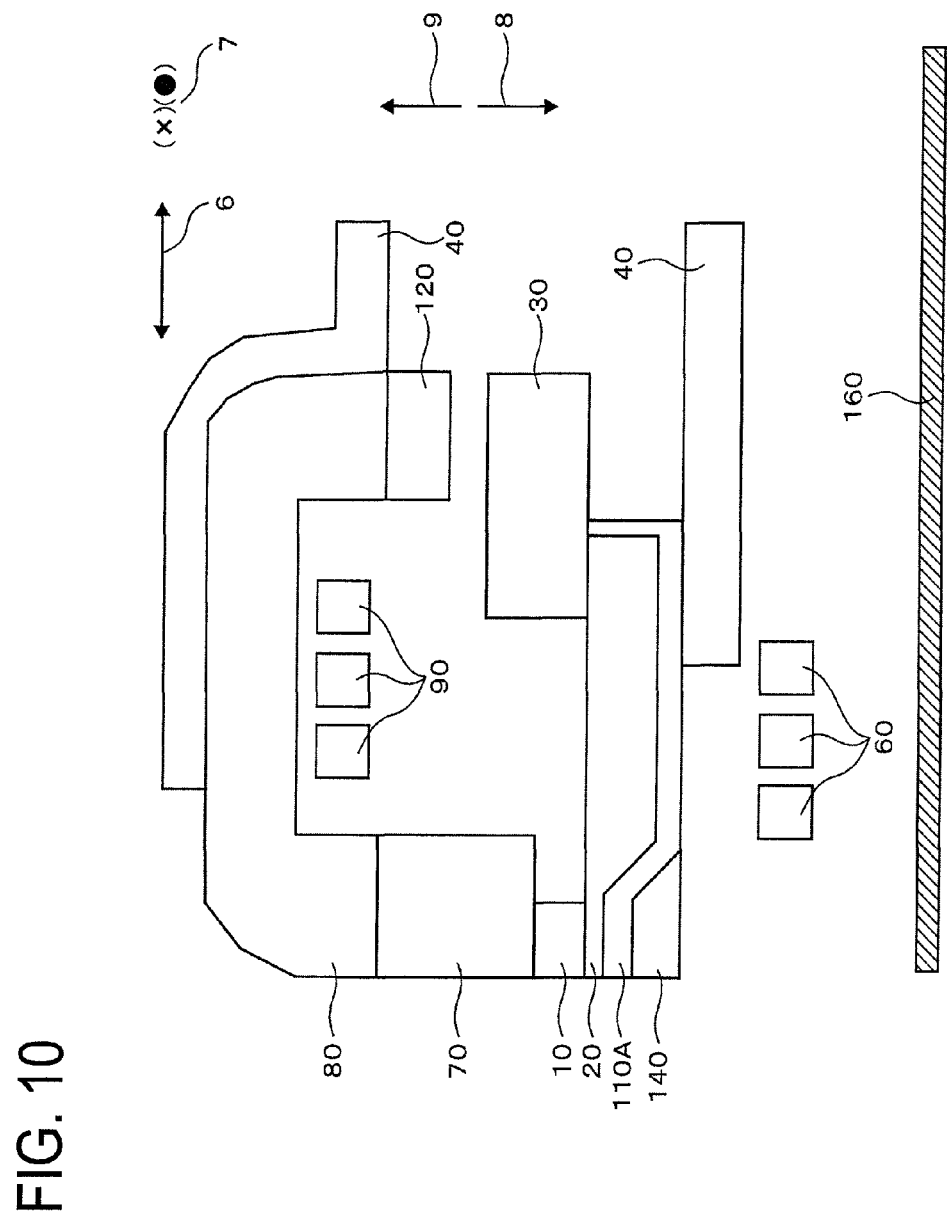
FIG. 10 is a cross-sectional view of a recording head including a spin torque oscillator according to a fifth embodiment of the present invention.

FIG. 10 is a schematic cross-sectional view of the surface including the spin torque oscillator 10 in the head moving direction 8 of a magnetic recording head according to a fifth embodiment of the present invention. The configuration is such that the non-magnetic electrode 40 is connected to the main pole 20 and to the sub pole 80, respectively. More specifically, after the formation shown in FIGS. 6A to 6E of the first embodiment is completed, the non-magnetic electrode 40 is formed on the sub pole 80 as shown FIG. 8A.

Sixth Embodiment

Figure 11:
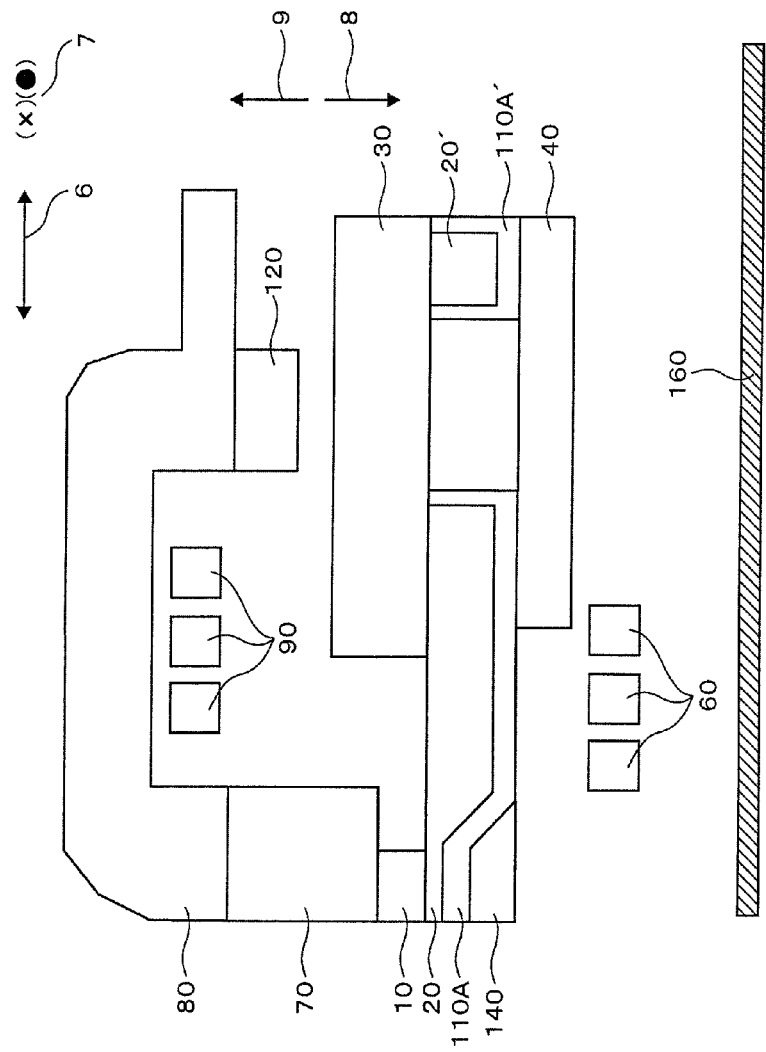
FIG. 11 is a cross-sectional view of a recording head including a spin torque oscillator according to a sixth embodiment of the present invention.

FIG. 11 is a schematic cross-sectional view of the surface including the spin torque oscillator 10 in the head moving direction 8 of a magnetic recording head according to a sixth embodiment of the present invention. The configuration is such that the non-magnetic electrode 40 in the first embodiment is electrically coupled to the yoke magnetic film 30 in parallel to form a circuit.

The yoke magnetic film 30 is used as the line parallel to the non-magnetic electrode 40 to serve as the lower electrode (the electrode on the side of the main pole 20) of the recording head. In this way, further reduction in the line resistance can be achieved.

Seventh Embodiment

Figure 12:
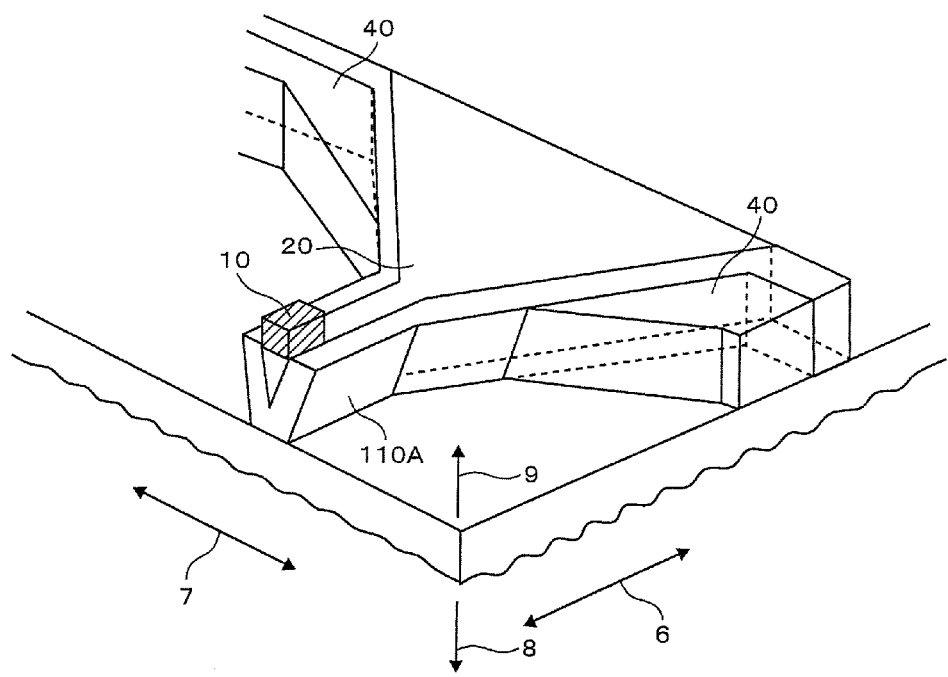
FIG. 12 is a perspective view of a recording head including a spin torque oscillator according to a seventh embodiment the present invention.

FIG. 12 is a bird's eye view of a magnetic recording head according to a seventh embodiment of the present invention. The configuration is such that the non-magnetic electrode 40 is provided on a side surface of the main pole 20. The non-magnetic electrode 40 is formed on the side surface of the shield gap film 110A. Then, the non-magnetic electrode 40 is drawn in the height direction indicated by the arrow 6 to serve as the lower electrode.

Eighth Embodiment

FIG. 13A is a schematic cross-sectional view of the main pole 20 that is formed by an etching process with mask and not by a damascene process. In FIG. 13A, reference numeral 110B denotes a non-magnetic line. In the first to seventh embodiments, the description has mainly focused on the formation of the non-magnetic electrode 40 in the main pole 20 formed by the damascene process. The effect of the insertion of the non-magnetic electrode is the same when the main pole 20 is formed by the damascene process, and when the main pole 20 is formed by the etching process.

Figure 13B:
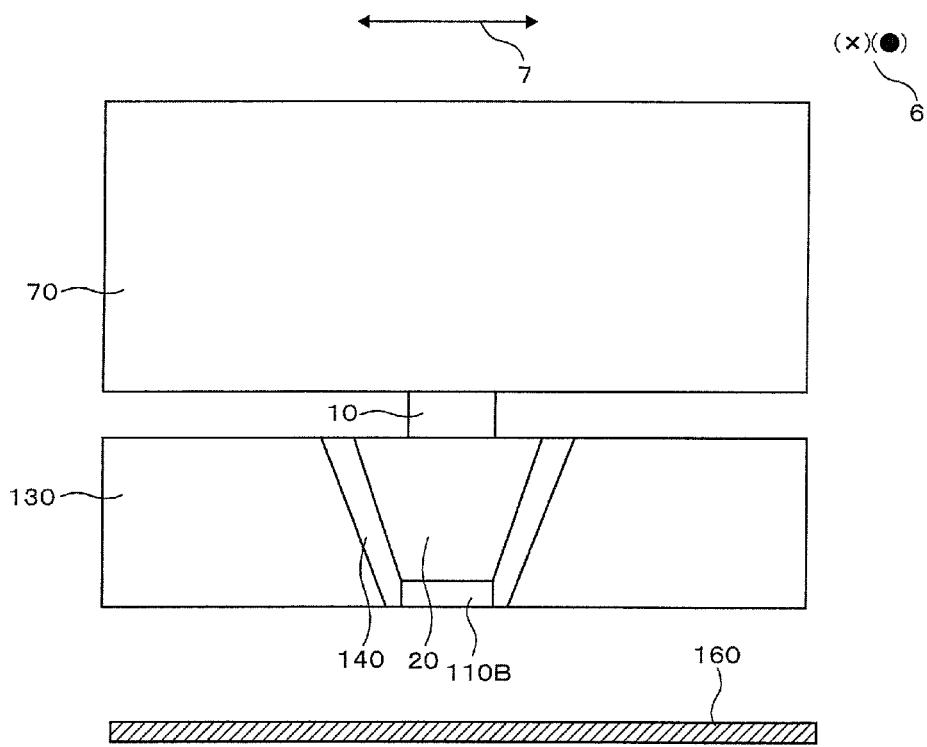
FIG. 13B is a schematic diagram of the medium-facing surface of the recording head including the spin torque oscillator in the seventh embodiment.

Here, FIG. 13B shows the configuration in the medium-facing surface of FIG. 13A. In the configuration in which the main pole is formed by the damascene process, the shield gap film 140 is provided between the main pole 20 and the side shield film 130, to serve as the non-magnetic line. While in the configuration in which the main pole 20 is formed by the etching process, the main pole 20 is formed before the shield gap film 140 is formed. Thus, in general, the shield gap film 140 is covered by an insulating film by a CVD process with high coverage. In such a configuration, the non-magnetic line 110B is formed from a non-magnetic material, such as a single layer film of Al, Ti, V, Cr, Cu, Ru, Rh, Pd, Ag, Ta, W, Ir, Pt, and Au, or a laminated layer including these materials. The non-magnetic line 110B is provided in the lower part of the main pole 20. Then, the non-magnetic line 110B and the main pole 20 are etched at the same time to form a line of the non-magnetic material. Thus, similar to the damascene configuration, the line of the non-magnetic material can be drawn to the end of the main pole 20. As a result, it is possible to prevent the variation of the electrical resistance due to the AMR effect or the eddy current.

Ninth Embodiment

Figure 14:
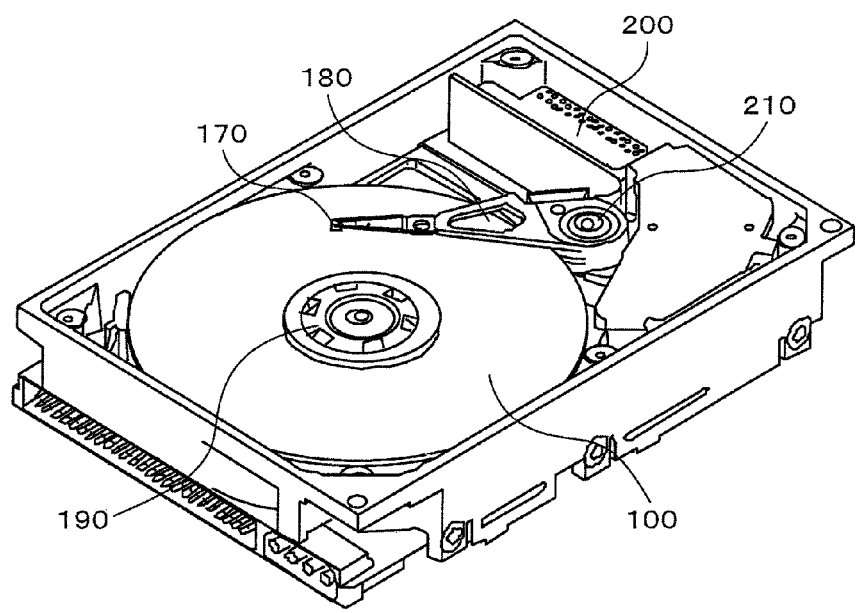
FIG. 14 is a perspective view showing the entire configuration of a magnetic disk device according to the embodiments of the present invention.

FIG. 14 shows a magnetic disk device including a magnetic recording head formed as described in the above embodiments. In FIG. 14, reference numeral 170 denotes a magnetic head including the spin torque oscillator 10, 180 denotes an arm with the magnetic head 170 provided at the end thereof, 100 denotes a magnetic disk (magnetic recording medium), 190 denotes a spindle motor for rotating and driving the magnetic disk, 200 denotes a signal processing circuit for processing a magnetic recording reproduction signal, and 210 denotes a voice coil motor for rotating and driving the arm 180.

According to the present invention, the magnetic head 170 including the spin torque oscillator 10 is used to achieve higher recording density by microwave assist effect.

What is claimed is:

1. A magnetic recording head used for microwave-assisted magnetic recording, the magnetic recording head comprising:
    a main pole;
    a spin torque oscillator disposed on the main pole, the spin torque oscillator including a high-speed rotating magnetization layer in which the magnetization is rapidly rotated by a spin torque;
    a trailing shield disposed on the spin torque oscillator;
    a sub pole magnetically coupled to the trailing shield disposed in a medium-facing surface, extending in a vertical direction to the medium-facing surface;
    a yoke magnetic film disposed adjacent to the main pole; and
    a non-magnetic electrode disposed parallel to the yoke magnetic film to serve as an electric line parallel to the spin torque oscillator, and disposed outside of a trailing gap between the main pole and the trailing shield, in which the spin torque oscillator is disposed, wherein the distance from the non-magnetic electrode to the medium-facing surface is less than the distance from the yoke magnetic film to the medium-facing surface.

2. The magnetic recording head according to claim 1, wherein the trailing shield is disposed on the spin torque oscillator,
wherein the sub pole is formed adjacent to the trailing shield, and
wherein the non-magnetic electrode is disposed adjacent to the trailing shield or the sub pole.

3. The magnetic recording head according to claim 1, wherein a side shield film is disposed in the vicinity of the main pole,
wherein the non-magnetic electrode is formed adjacent to the side shield film, and
wherein the side shield film is electrically coupled to the non-magnetic electrode to form a single electric line.

4. The magnetic recording head according to claim 1, wherein a shield gap film is disposed between a side shield film and the main pole, and the shield gap film is formed from a non-magnetic material, and
wherein the non-magnetic electrode is formed adjacent to the shield gap film.

5. The magnetic recording head according to claim 4, wherein the non-magnetic electrode is disposed adjacent to the main pole or the shield gap film, and
wherein the non-magnetic electrode is also disposed adjacent to the sub pole or the trailing shield.

6. The magnetic recording head according to claim 1, wherein a back gap magnetically couples the yoke magnetic film to the sub pole, and
wherein the back gap is electrically isolated from the yoke magnetic film.

7. The magnetic recording head according to claim 1, wherein the material of the non-magnetic electrode is a single layer film of Al, Ti, V, Cr, Cu, Ru, Rh, Pd, Ag, Ta, W, Ir, Pt, and Au, or a laminated film including a combination of two or more different single layer films.

8. The magnetic recording head according to claim 1, wherein the non-magnetic electrode is disposed about orthogonally to the medium-facing surface.

9. A method of manufacturing a magnetic recording head, comprising the steps of:
forming a non-magnetic electrode;
forming a main pole on the non-magnetic electrode, the main pole having a medium-facing surface;
forming a yoke magnetic film on the main pole, wherein a distance from the yoke magnetic film to the medium-facing surface is greater than a distance from the non-magnetic electrode to the medium-facing surface;
forming a spin torque oscillator by a deposition process on the main pole;
forming a side shield film on the side of the main pole or on the side of the spin torque oscillator; and
forming a trailing shield on the spin torque oscillator.

10. A method of manufacturing a magnetic recording head, comprising the steps of:
forming a main pole, the main pole having a medium-facing surface;
forming a yoke magnetic film adjacent to the main pole;
forming a spin toque oscillator by a deposition process on the main pole;
forming a side shield film on the side of the main pole or on the side of the spin torque oscillator;
forming a trailing shield on the spin toque oscillator;
forming an upper magnetic pole on the trailing shield; and
forming a non-magnetic electrode disposed adjacent to a magnetic material constituting the magnetic pole, wherein the distance from the non-magnetic electrode to the medium-facing surface is less than the distance from the yoke magnetic film to the medium-facing surface.

11. A magnetic disk device for writing information to a rotating magnetic disk, comprising: a magnetic disk;
a magnetic head, configured to write information to the rotating magnetic disk by moving the magnetic head in a predetermined direction;
wherein the magnetic head is a magnetic head used for microwave-assisted magnetic recording; and
wherein the magnetic head comprises:
a main pole;
a spin toque oscillator disposed on the main pole, the spin toque oscillator including a high-speed rotating magnetization layer in which the magnetization is rapidly rotated by a spin torque;
a trailing shield disposed on the spin torque oscillator;
a sub pole disposed on the trailing shield;
a yoke magnetic film disposed adjacent to the main pole; and
a non-magnetic electrode disposed parallel to the yoke magnetic film to serve as an electric line parallel to the spin torque oscillator, and disposed outside of the main pole, wherein the distance from the non-magnetic electrode to a surface of the magnetic disk is less than the distance from the yoke magnetic film to the surface of the magnetic disk.

12. The magnetic disk device according to claim 11, wherein the non-magnetic electrode is disposed about orthogonally to the rotating magnetic disk.

* * * * *